W. H. Andrews,
Cam.
No. 33,771.   Patented Nov. 26, 1861.
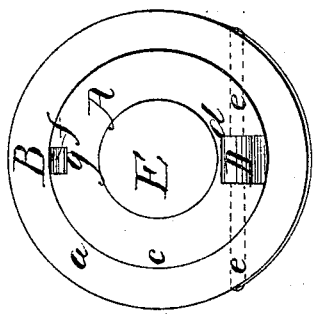
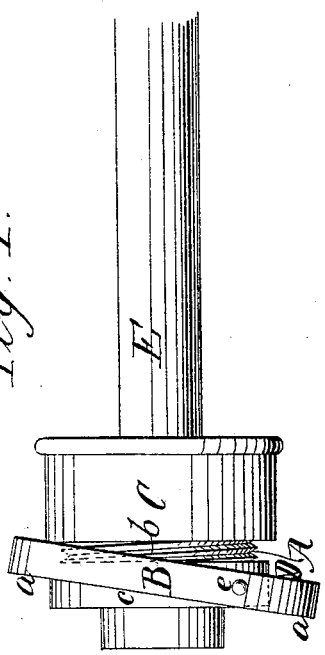
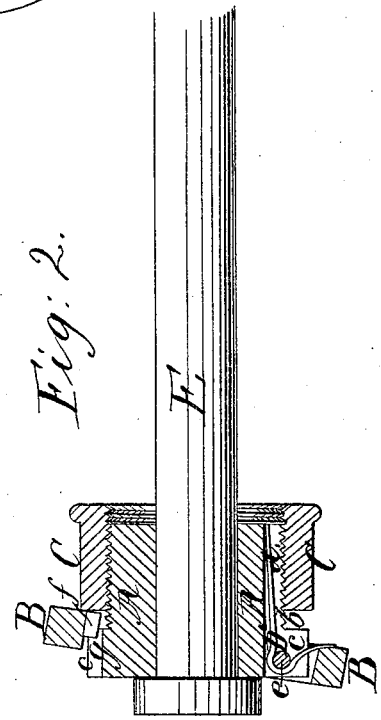
Witnesses;
Inventor;
W. H. Andrews
Per. Munn & Co.
Attys.

UNITED STATES PATENT OFFICE.

WILLIAM H. ANDREWS, OF NEW HAVEN, CONNECTICUT.

IMPROVEMENT IN VARIABLE CAMS.

Specification forming part of Letters Patent No. 33,771, dated November 26, 1861.

*To all whom it may concern:*

Be it known that I, WILLIAM H. ANDREWS, of the city and county of New Haven, and State of Connecticut, have invented a new and Improved Variable Cam for the Feed-Motion of Sewing-Machines and for other Purposes; and I do hereby declare that the following is a full, clear, and exact description of the same, reference being had to the accompanying drawings, forming part of this specification, in which—

Figure 1 is a side view of the cam and shaft by which it is carried. Fig. 2 exhibits an axial section of the cam. Fig. 3 is a face view of the same.

Similar letters of reference indicate corresponding parts in the several figures.

This invention relates to cams for producing movements in a direction parallel, or nearly so, with their axis of rotation. It consists in a peculiar construction of such a cam whereby its throw can be varied at pleasure, and it may be made to operate in all conditions without any percussive action, and consequently without noise.

To enable others skilled in the art to make and use my invention, I will proceed to describe its construction and operation.

The cam is composed of a hub A, a ring B, a loose collar or nut C, and a spring D, the face $a$ of the ring B constituting the working-face of the cam. The hub A, which is keyed or otherwise secured to the shaft E, has upon its exterior a screw-thread $b$, which extends nearly its whole length, and a flange $c$ is formed at one end of this screw-thread. The ring B is fitted loosely to the exterior of the flange $c$, and is pivoted thereto by a pin $e$, which is arranged in a plane perpendicular to the axis of the shaft and in a position as nearly tangential to the exterior of the said flange as is consistent with a proper hold in the metal thereof. The spring D is so applied between the hub and ring within a slot $d$ in the hub and kept in place by the pin $e$, as shown in Fig. 2, that it acts to throw the ring into an oblique position relatively to the planes of revolution of the hub. The loose collar or nut C is screwed internally to fit the screw-thread $b$ on the exterior of the hub and forms a resting-place for the side of the ring farthest from the pin $e$, the ring being provided at that part with an internal protuberance $f$, upon which the said collar or nut can act without interfering with either face of the ring. This protuberance works in a groove $g$ in the flange $c$. The spring keeps the protuberance $f$ of the ring in contact with the collar or nut C, and by screwing the said collar or nut toward or from the flange $c$ the ring is caused to have a less or more oblique position and a less or greater throw, the throw increasing with the increase of distance of the nut or collar from the flange and consequent increase of obliquity of the ring, and vice versa.

This cam is intended to have applied in combination with it a spring for keeping the device upon which it is to operate in contact with the face $a$.

What I claim as my invention, and desire to secure by Letters Patent, is—

The variable cam composed of a hub A, ring B, spring D, and nut or adjustable collar C, the whole combined and operating substantially as herein specified.

WM. H. ANDREWS.

Witnesses:
 RICHD. L. STORY,
 HORACE P. DIBBLE.